(12) United States Patent
Jaaskelainen et al.

(10) Patent No.: US 11,366,243 B2
(45) Date of Patent: Jun. 21, 2022

(54) DRA DAS SYSTEM

(71) Applicant: Halliburton Energy Services, Inc., Houston, TX (US)

(72) Inventors: Mikko Jaaskelainen, Katy, TX (US); Jason Edward Therrien, Cypress, TX (US); Seldon David Benjamin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 631 days.

(21) Appl. No.: 16/303,370

(22) PCT Filed: Jul. 22, 2016

(86) PCT No.: PCT/US2016/043478
§ 371 (c)(1),
(2) Date: Nov. 20, 2018

(87) PCT Pub. No.: WO2018/017111
PCT Pub. Date: Jan. 25, 2018

(65) Prior Publication Data
US 2020/0319358 A1    Oct. 8, 2020

(51) Int. Cl.
*G01V 1/20* (2006.01)
*E21B 47/135* (2012.01)
*G01V 1/52* (2006.01)

(52) U.S. Cl.
CPC ............ *G01V 1/208* (2013.01); *E21B 47/135* (2020.05); *G01V 1/52* (2013.01); *G01V 2210/1429* (2013.01)

(58) Field of Classification Search
CPC .. G01V 1/208; G01V 1/52; G01V 2210/1429; E21B 47/135
(Continued)

(56) References Cited

U.S. PATENT DOCUMENTS 9,677,957 B2 * 6/2017 Dong ................. G01D 5/35316
2005/0105167 A1 5/2005 Martinelli et al.
(Continued)

FOREIGN PATENT DOCUMENTS

RU     2566603 C1    10/2015
WO    2014130269 A1   8/2014

OTHER PUBLICATIONS

PCT Application Serial No. PCT/US2016/043478, International Search Report, dated Apr. 21, 2017, 3 pages.
(Continued)

*Primary Examiner* — Daniel L Murphy
(74) *Attorney, Agent, or Firm* — DeLizio, Peacock, Lewin & Guerra

(57) ABSTRACT

Disclosed is a system and method for improving the performance of downhole Distributed Acoustic Sensing (DAS) systems by simultaneous use of co-propagating and counter-propagating Distributed Raman Amplification (DRA). It uses a surface DRA system with a surface DAS system to combine their laser sources where the distal end of the downhole sensing fiber use uses a Wavelength Division Multiplexer (WDM) to optically split the DRA and DAS signals onto two optical fibers. The DAS fiber/signal is terminated with a low reflectance termination to minimize a potential back reflection whereas the DRA fiber is terminated with a high reflectance termination causing all the light to reflect back up the sensing fiber. This arrangement allows for simultaneous co and counter-propagating DRA of the DAS signals, both the transmitted pulse and the back scattered light, thus creating the maximum amount of gain possible.

17 Claims, 4 Drawing Sheets

(58) Field of Classification Search
USPC .......................................................... 367/25
See application file for complete search history.

(56) References Cited

U.S. PATENT DOCUMENTS

| | | |
|---|---|---|
| 2007/0145251 A1 | 6/2007 | Ogura et al. |
| 2012/0018167 A1 | 1/2012 | Konopczynski et al. |
| 2014/0152995 A1 | 6/2014 | Dong et al. |
| 2015/0114127 A1 | 4/2015 | Barfoot et al. |

OTHER PUBLICATIONS

PCT Application Serial No. PCT/US2016/043478, International Written Opinion, dated Apr. 21, 2017, 5 pages.

\* cited by examiner

DRA DAS SYSTEM

BACKGROUND

The present embodiment relates in general to the field of Distributed Acoustic Sensing (DAS) systems and, in particular, to improving the performance of such systems by the simultaneous use of co-propagating and counter-propagating Distributed Raman Amplification (DRA).

DAS systems commonly uses a technique called Coherent Optical Time Domain Reflectometry (C-OTDR), where a number of short pulses of highly coherent light is transmitted down the optical fiber with sufficient delay between the pulses so that only one (or one set of pulses) is traveling in the fiber at any given time. The resulting back scattered light is then collected and analyzed for any optical path length disturbances caused by acoustic and/or vibrations. DAS systems normally operate on single mode fibers in the C-band around 1550 nm.

Current DAS systems may have limited optical budget, and this limits the performance of the systems. It is desirable to get better signal to noise ratios for applications like production monitoring or micro-seismic sensing where signal levels may be low.

There is thus a need for augmenting the performance of current DAS systems in an affordable and useful way.

Described herein is a system and method for improving DAS systems by simultaneous use of co-propagating and counter-propagating Distributed Raman Amplification (DRA). This approach uses a surface DRA system with a surface DAS system combined via a Wavelength Division Multiplexer (WDM) where the distal end of the downhole sensing fiber uses a WDM to optically split the DRA and DAS signals onto two optical fibers. The DAS fiber/signal is terminated with a low reflectance termination to minimize a potential back reflection whereas the DRA fiber is terminated with a high reflectance termination causing all the light to reflect back up the sensing fiber. This arrangement allows for simultaneous co and counter-propagating DRA of the DAS signals, both the transmitted pulse and the back scattered light, thus creating the maximum amount of gain possible.

BRIEF DESCRIPTION OF THE DRAWINGS

Elements in the figures have not necessarily been drawn to scale in order to enhance their clarity and improve understanding of these various elements and embodiments of the application. Furthermore, elements that are known to be common and well understood to those in the industry are not depicted in order to provide a clear view of the various embodiments of the application, thus the drawings are generalized in form in the interest of clarity and conciseness.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
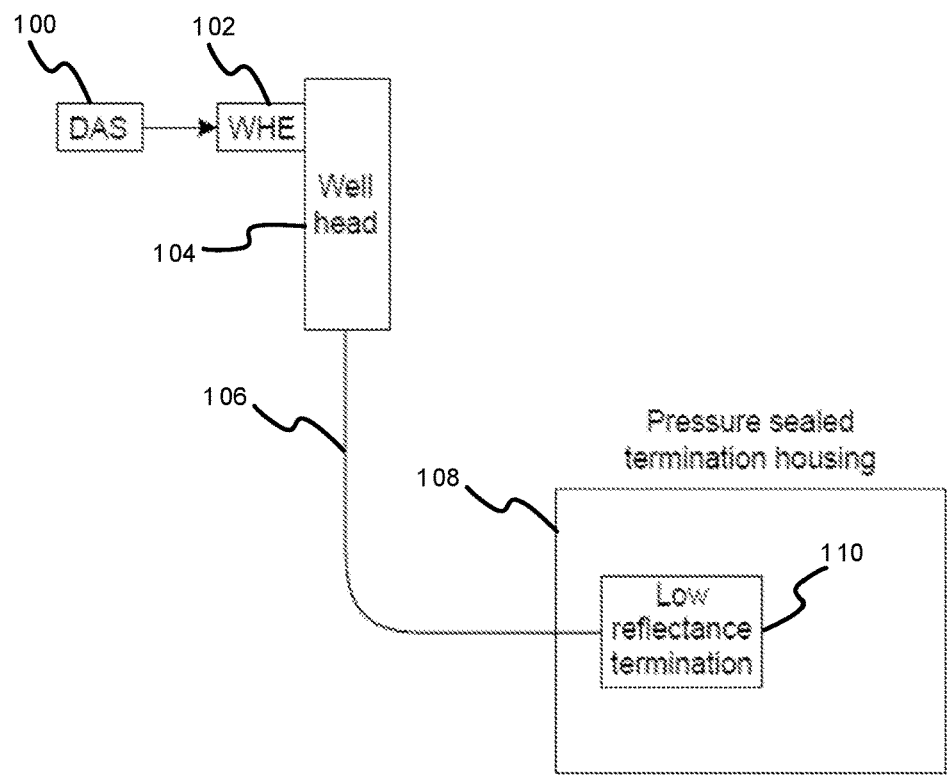
FIG. 1 illustrates a typical DAS system deployment.
Figure 2:
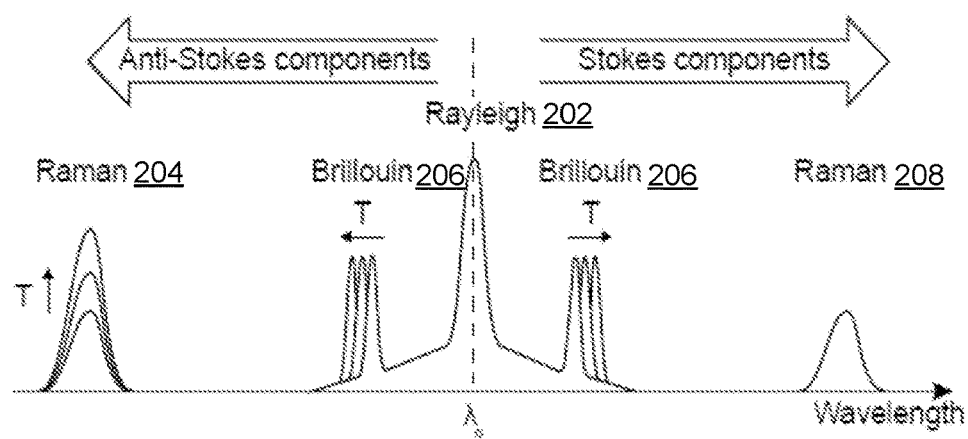
FIG. 2 illustrates optical spectrum showing Rayleigh, Brillouin and Raman bands commonly used for distributed fiber optic sensing and Raman amplification.

Turning first to FIG. 1, an example DAS system 100 used downhole commonly uses a technique called Coherent Optical Time Domain Reflectometry (C-OTDR), wherein the laser of the DAS system 100 transmits a number of short pulses of highly coherent light routed through an optical fiber 106 routed through a Well Head Exit (WHE) 102 and through the well head 104 into the downhole fiber optic sensing cable 106 with sufficient delay between the pulses so that only one (or one set of pulses) is traveling in the fiber 106 at any given time. The distal end of the optical fiber 106, shown enclosed in a pressure sealed termination housing 108 has a low reflection end 110 to preclude excess system noise caused by high levels of back reflected light. High levels of back reflected light may increase the system noise floor and mask low level signals and/or saturate the detection circuit for some period of time. The resulting back scattered light is then collected and analyzed for any optical path length disturbances caused by acoustic and/or vibrations and/or thermal effects causing changes in the optical fibers refractive index. DAS systems normally operate on single mode fibers in the C-band around 1550 nm and may also be designed for operation with multi mode fibers. Various scattering effects are commonly used for fiber optic sensing and the most common effects can be seen in FIG. 2, which shows some of the typical backscattered wavelengths, including Rayleigh wavelengths 202 that are backscattered at the primary wavelength of the pulsed DAS laser, Brillouin wavelengths 206 on either side of the Rayleigh wavelengths 202, and Raman Stokes wavelengths 208 and anti-Stokes wavelengths 204 further displaced from the primary Rayleigh wavelength.

DAS and DRA

C-OTDR DAS systems are based the Rayleigh effect, and Distributed Raman Amplification (DRA) is based on Stimulated Raman Scattering (SRS). A DRA system with a source centered around 1450 nm and having a frequency that will have a Stokes Raman shift of 13 THz, which equals to around 100 nm for peak Raman gain, which would then amplify the DAS signals around 1550 nm using Raman amplification.

Figure 3:
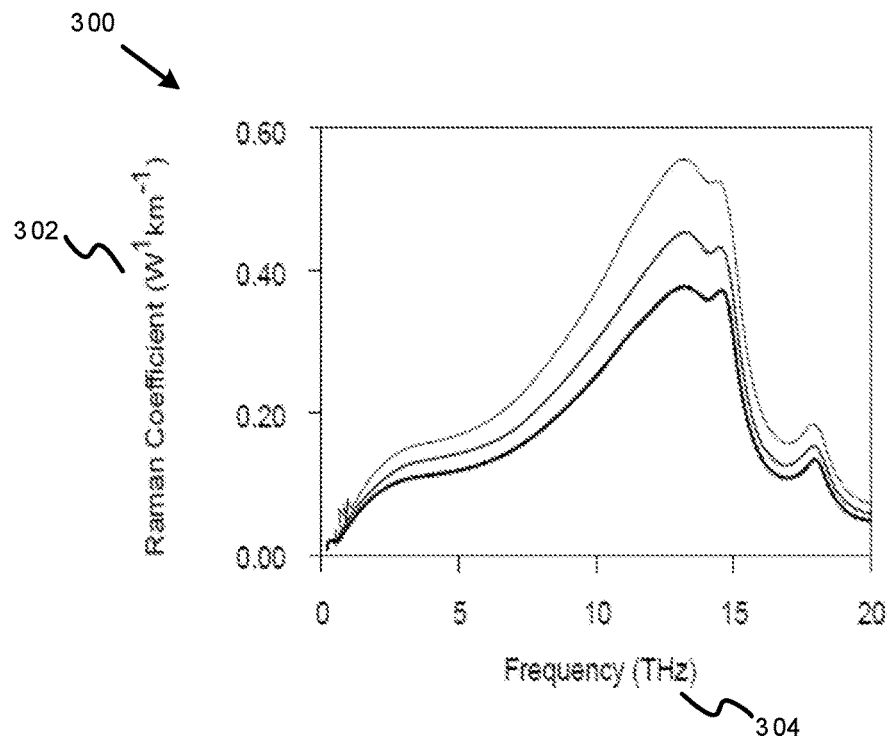
FIG. 3 illustrates the Raman gain shape in various optical fibers.

A DRA system is commonly used for distributed amplifications where a pump laser injects continuous wave high power laser light (0.5 W-1 W) into a single mode optical fiber and that laser light creates stimulated Raman scattering (SRS) with a broad Stokes peak at a frequency around 13 THz away from the frequency of the center wavelength of the laser source. SRS is a nonlinear process. The 13 THz shift away from the center wavelength is exhibited in FIG. 3 for three different typed of single-mode fibers. FIG. 3 illustrates the Raman gain shape over frequency in various optical fibers. A graph 300 of FIG. 3 includes a Y-axis 302 (the Raman Coefficient) and an X-axis 304 (frequency).

Signals traveling in the optical fiber at the Raman stokes wavelength band of said laser light will be amplified by a small amount per unit length (~10E−6), and will incur a signal amplification over distance. The interaction length is normally on the order of 10's of km's, which is significantly longer than the fiber lengths used for downhole fiber optic sensing. Raman amplifiers are used in in two configurations, either co-propagating or counter propagation distributed Raman amplification, where each system will have different advantages.

Figure 4:
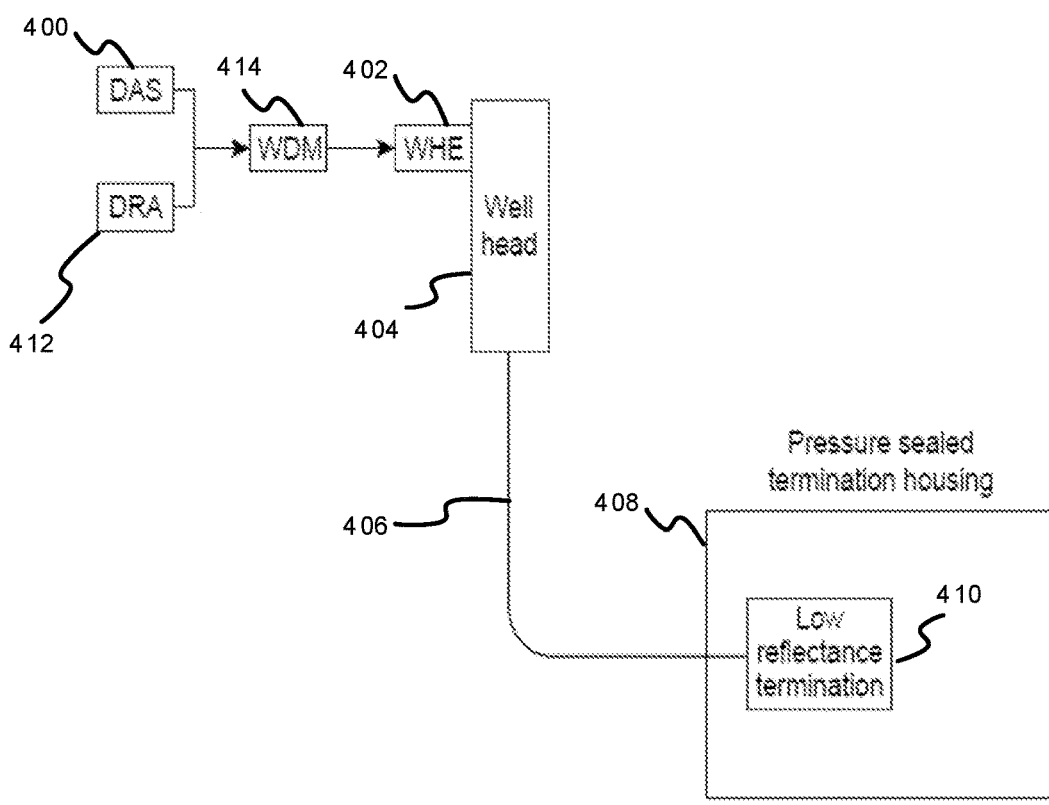
FIG. 4 illustrates an approach to combine DAS and DRA.

It may be possible to add DRA to the configuration of FIG. 1, and the optical schematic for this implementation can be seen in FIG. 4. In this scheme continuous wave 1450 nm pump light from the DRA 412 is combined with the pulse light from the DAS 400 in a wavelength division multiplexer (WDM) 414 and travels down the optical fiber 406 via the WHE 402 and the well head 404 and any 1550 nm signals overlapping with the Stokes band generated by SRS may then be amplified. The 1550 nm pulse traveling down the optical fiber 406 will be amplified due to co-propagating Raman amplification, and any back scattered light traveling up towards the DAS system 400 will be amplified due to counter propagating Raman amplification. It is desirable to minimize fiber end back reflections and the use of a low reflectance end termination 410 within the pressure sealed termination housing 408 is required for high performance DAS system operation.

But use of Raman amplifiers (DRA) in relative short lengths of fibers commonly used in oil & gas wells may not be highly efficient using conventional means as you only have access to the surface end and can therefore only use co-propagating Raman amplification for the downward travelling pulse while the back scattered light experiences counter propagating Raman amplification and the fiber lengths are relatively short so the gain will be limited. Additional losses, i.e., WDM path attenuation added to the DAS signal path may offset any impact of Raman gain, and DRA is often not implemented due to the additional optical losses. A lot of 1450 nm light is also lost in the low reflection termination at the distal cable end before it's been able to provide any gain to the 1550 nm signal.

Figure 5:
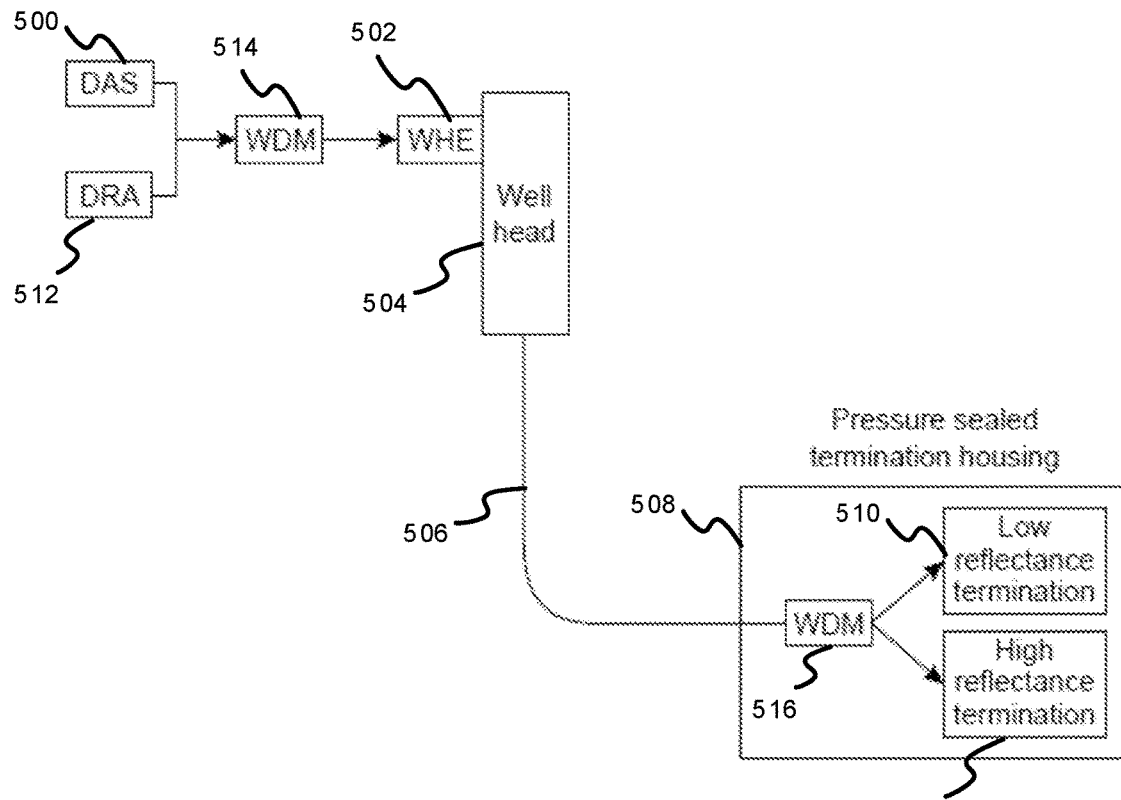
FIG. 5 is a schematic for combining DAS and DRA to achieve the desired results.

The system herein discloses simultaneous use of co-propagating and counter-propagating Distributed Raman Amplification (DRA) using a new novel configuration. A surface DRA system 512 Wavelength Division Multiplexed is combined with a surface DAS system 500 using a Wavelength Division Multiplexer (WDM) 514 as shown in FIG. 5 where the distal end of the downhole sensing fiber 506 uses a second WDM 516 to optically split the DRA and DAS signals onto two optical fibers. The WDM is coupled to the downhole sensing fiber 506 via the WHE 502 and the well head 504. The DAS fiber/signal is terminated with a low reflectance termination 510 (located in a pressure seal termination housing 508) to minimize a potential back reflection whereas the DRA fiber is terminated with a high reflectance termination 518 (also located in the pressure seal termination housing 508) causing the large majority of all the light to reflect back up through the WDM and into the sensing fiber 506. This arrangement allows for simultaneous co- and counter-propagating DRA of the DAS signals, as both the transmitted DAS pulse and the back scattered coherent light both experience both co- and counter propagating Raman gain, thus creating the maximum amount of gain possible.

The system may use a DRA module with one laser source that may be de-polarized using e.g., a Lyot de-polarizer or multiple laser diodes that may be combined using WDM's and/or Polarization Beam Combiners (PBC) in a manner to minimize polarization dependent gain. The DRA will have an optical isolator at the output to avoid de-stabilizing the laser sources due to back scattered or reflected light. The center wavelength of the DRA may reside around 1450 nm to provide gain around 1550 nm.

The DAS system may operate at around 1550 nm, and any conventional DAS system may be used. There are other DRA/DAS wavelengths that may work as long as the spacing of frequencies between the signals is about 13 THz. Deviating from the 13 THz spacing will reduce the induced gain and decrease system performance.

The DAS and DRA modules may be connected using a WDM, and the combined output will be routed through a Well Head Exit (WHE) and through the well head into the downhole fiber optic sensing cable. The down-hole fiber optic cable is then terminated in a pressure housing that is capable of protecting the components inside the pressure housing against pressure and well bore fluids. The optical fiber may then be spliced to a 1450 nm/1550 nm WDM such that the 1450 nm light and 1550 nm light is separated. The WDM can preferably be a low loss fused fiber coupler based WDM.

The 1550 nm leg of the WDM will be terminated using a low reflective element that may be an angle cleave, a coreless optical fiber, an endlight termination or any other device that will result in a low or no optical back reflection from said element. It is desirable to minimize high amplitude signals back into the DAS system as the Erbium Doped Fiber Amplifier (EDFA) and/or detectors may saturate, or Amplified Stimulated Emission (ASE) may be back scattered and amplified before reaching the detector to cause an increase in system noise. Erbium Doped Fiber Amplifiers (EDFAs) are commonly used in systems operating around 1550 nm to amplify signals in both transmit and receive paths.

The 1450 nm leg of the WDM on the other hand would be connected to a high reflectance termination where the large majority of the laser light from the DRA is reflected back into the optical fiber. This will allow the remaining 1450 nm laser light to provide gain to the 1550 nm signals. As the backscattered and reflected light returns to the surface the DAS wavelengths are separated by the surface WDM to return to the DAS module for interrogation.

Figure 6:
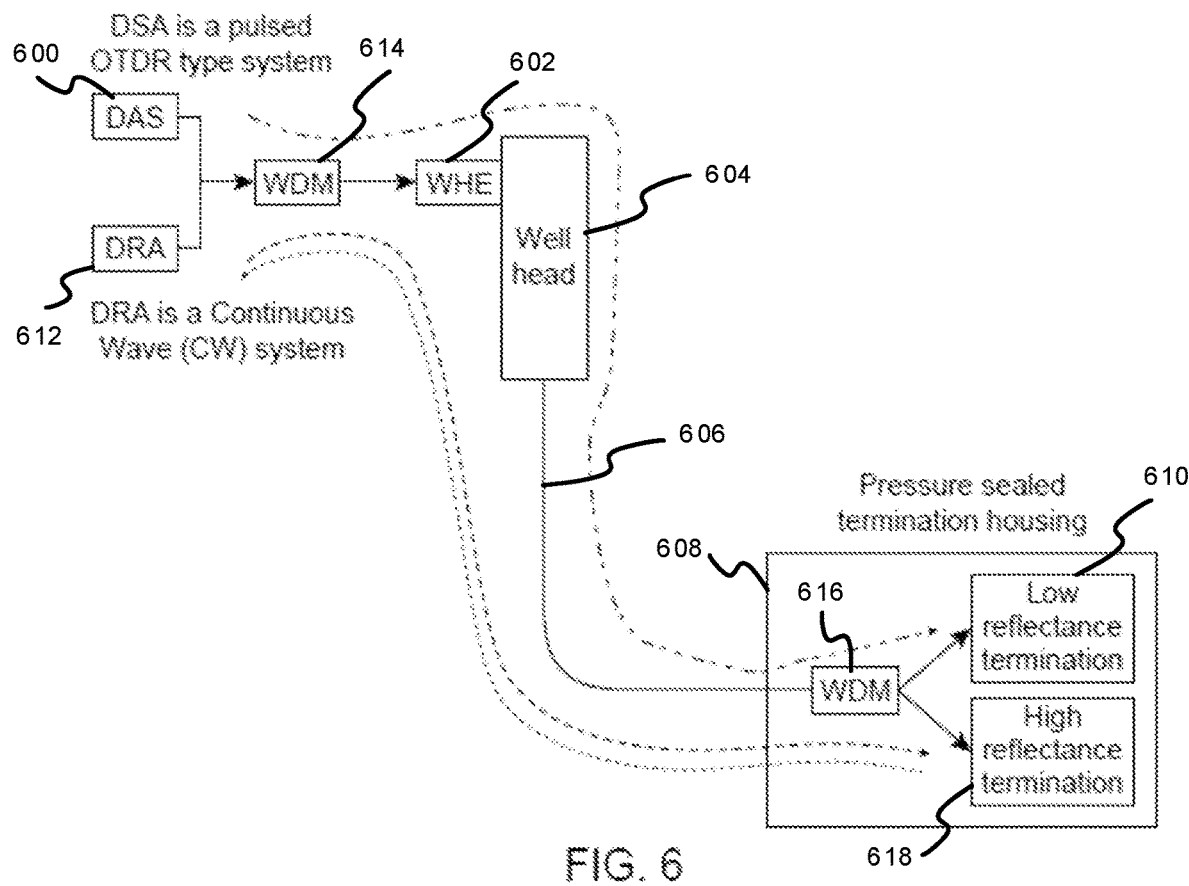
FIG. 6 illustrates signal paths for DAS pulse and Raman CW pump power.

Referring now to FIG. 6, the DRA 612 operates in continuous wave mode and the pump light continuously travels down the optical fiber 606 (via the WHE 602 and the well head 604 until it reaches the WDM 616 where the light is reflected off the high reflectance termination 618 (located in the pressure sealed termination housing 608) causing it to travel up the optical fiber 606 resulting in 1450 nm light continuously traveling both up and down the optical fiber 606.

The DAS 600 operates in a pulsed mode where one pulse (or a set of pulses) travels down the fiber 606 to the low reflectance termination 610 (located in the pressure sealed termination housing 608). The pulse will be amplified by both co- and counter propagating Raman amplification as it travels down the fiber 606 whereas prior art only use co-propagating light. Similarly, any back scattered light traveling up the fiber will also experience both counter and co-propagating Raman amplification whereas prior art only provided counter propagating gain.

Figure 7:
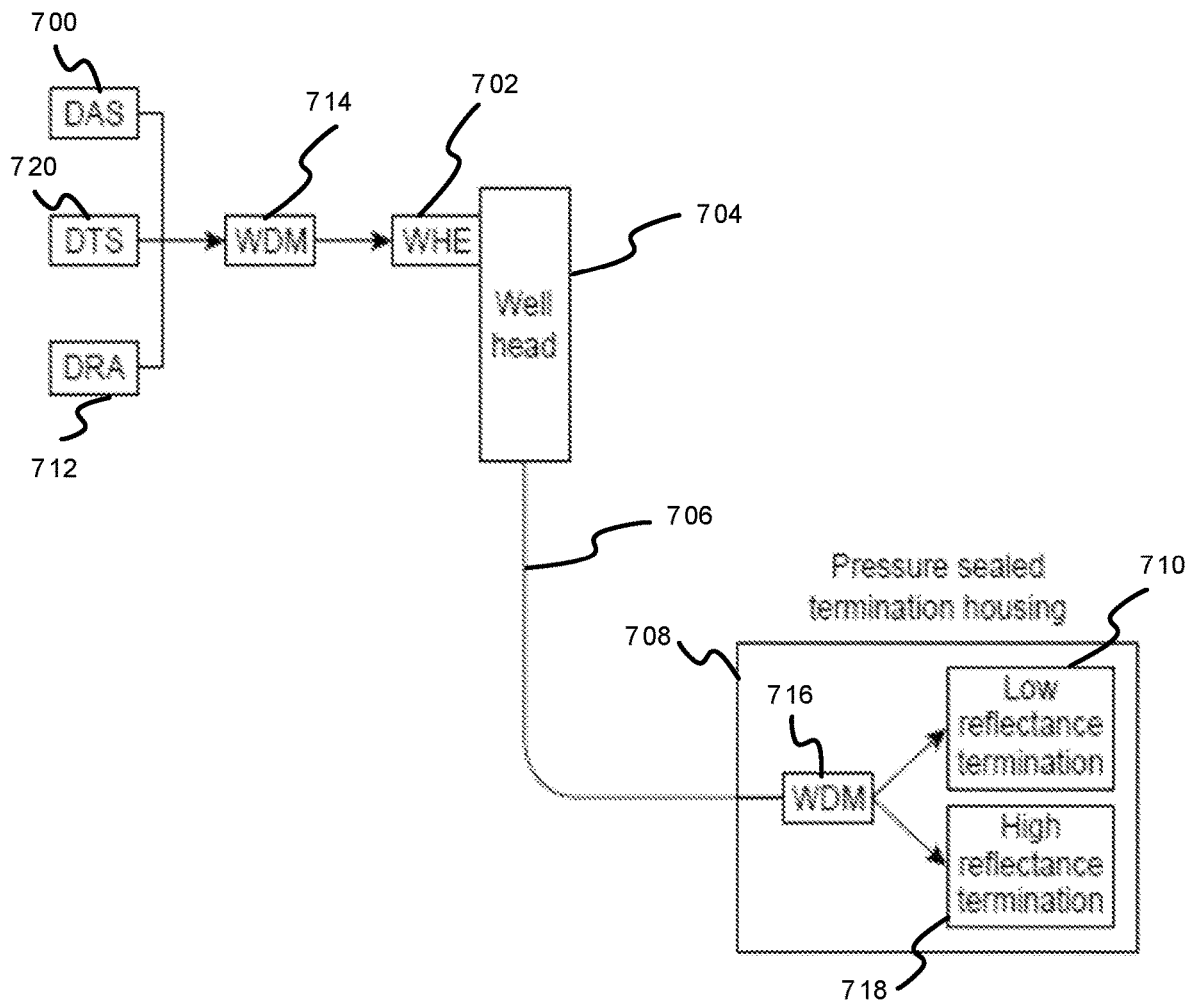
FIG. 7 illustrates an embodiment with a DTS system included.

In another embodiment, shown in FIG. 7 the system can also be combined with a Distributed Temperature Sensing (DTS) system 720 operating at around 1000 nm-1100 nm by using e.g., a low loss fiber based WDM 714. The DTS system 720 laser wavelength(s) and/or back scattered Stokes/anti-Stokes components should not overlap with the Raman gain profile generated by the DRA 712 as this may introduce gain of said optical signals and this could introduce temperature measurement errors given that the DTS system 720 calculates temperature as a function of the ratio of the Stokes and anti-Stokes intensities.

In this embodiment the DTS system 720 is designed at a lower wavelength sufficiently far away from the DAS 700 and DRA 712 to avoid any stimulated Raman scattering gain effects. The DTS system 720 is based on spontaneous Raman scattering and is therefore based on lower power levels where all non-linear effects are avoided. As shown, the signals from the DAS 700, the DTS system 720, and the DRA 712 are input into the WDM 712 and propagate through the optical fiber 706 (via the WHE 702 and the well head 704). The pressure sealed termination housing 708 includes the WDM 716, the low reflectance termination 710, and the high reflectance termination 718. The propagated signal is received by the WDM 716. Output from the WDM 716 is input into the low reflectance termination 710 and the high reflectance termination 718.

Value Added

The system described herein uses simple low cost optical components to significantly improve the signal to noise ratio of Raman amplified DAS systems used for downhole applications. It can also be used in combination with Distributed Temperature Sensing (DTS) systems by careful selection of the appropriate wavelengths.

Although certain embodiments and their advantages have been described herein in detail, it should be understood that various changes, substitutions and alterations could be made without departing from the coverage as defined by the appended claims. Moreover, the potential applications of the disclosed techniques are not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system comprising:
   an optical fiber having a surface proximal end and a distal downhole end;
   a surface distributed acoustic sensing system having a first laser source to output a first light at a first primary wavelength;
   a surface Raman distributed amplifier having a second laser source to output a second light at a second primary wavelength, wherein the first primary wavelength and the second primary wavelength are spaced apart by a distance such that the first light propagating toward the distal end is amplified by the second light propagating toward the distal end and such that back scattered light from the second light propagating back along the optical fiber toward the surface proximal end performs counter propagation amplification of back scattered light from the first light propagating back along the optical fiber toward the surface proximal end;
   a surface combiner to combine the first light and the second light output into a combined light from the first laser source and the second laser source, respectively, to input into the surface proximal end of the optical fiber;
   a wavelength division multiplexer coupled to the distal downhole end of the optical fiber, wherein the wavelength division multiplexer is to receive the combined light and to separate the combined light into the first and second primary wavelengths into a first and second fiber leg;
   a low reflectance termination on the first fiber leg; and
   a high reflectance termination on the second fiber leg.

2. The system of claim 1, wherein the first primary wavelength is centered around 1550 nanometers (nm).

3. The system of claim 1, wherein the second primary wavelength is centered around 1450 nanometers (nm).

4. The system of claim 1, wherein the surface combiner for combining the first and second light from the laser sources is the wavelength division multiplexer (WDM).

5. The system of claim 1, wherein the optical fiber is a single mode optical fiber.

6. The system of claim 1, wherein the optical fiber is a multimode optical fiber.

7. The system of claim 1, wherein the second laser source is de-polarized.

8. The system of claim 1, wherein the surface Raman distributed amplifier has multiple laser diodes combined using a wavelength division multiplexer and a Polarization Beam combiner.

9. The system of claim 1, further comprising a surface distributed temperature sensing system having single or dual laser sources.

10. A method comprising:
    generating, by a first laser source at a surface of a wellbore and for distributed acoustic sensing, a first light at a first primary wavelength;
    generating, by a second laser source of a surface Raman distributed amplifier, a second light at a second primary wavelength;
    combining the first light with the second light to create a combined light;
    propagating the combined light from a surface distal end of an optical fiber and along the optical fiber having a downhole distal end at a location in the wellbore, wherein the first primary wavelength and the second primary wavelength are spaced apart by a distance such that the first light propagating toward the distal end is amplified by the second light propagating toward the distal end and such that back scattered light from the second light propagating back along the optical fiber toward a surface proximal end performs counter propagation amplification of back scattered light from the first light propagating back along the optical fiber toward the surface proximal end; and separating, at the distal end of the optical fiber, the combined light into the first light and the second light.

11. The method of claim 10, wherein the first primary wavelength is centered around 1550 nanometers (nm).

12. The method of claim 10, wherein the second primary wavelength is centered around 1450 nanometers (nm).

13. The method of claim 10, wherein combining the first light with the second light comprises combining the first light with the second light using a wavelength division multiplexer (WDM).

14. The method of claim 10, wherein the optical fiber is a single mode optical fiber.

15. The method of claim 10, wherein the optical fiber is a multimode optical fiber.

16. The method of claim 10, wherein the surface Raman distributed amplifier has multiple laser diodes that are combined using a wavelength division multiplexer and a Polarization Beam combiner.

17. The method of claim 10, further comprising adding a surface distributed temperature sensing (DTS) system having single or dual laser sources.

* * * * *